United States Patent [19]

Makinson et al.

[11] Patent Number: 5,454,894
[45] Date of Patent: Oct. 3, 1995

[54] APPARATUS FOR PRODUCING TIRE WITH INJECTION MOLDED WHITE SIDEWALL

[75] Inventors: Charles L. Makinson, Jackson Township; John G. Van Nieuwal, Marshallville, both of Ohio

[73] Assignee: The Goodyear Tire & Rubber Company, Akron, Ohio

[21] Appl. No.: 220,279

[22] Filed: Mar. 30, 1994

[51] Int. Cl.⁶ .......................... B60C 13/00; B60C 13/02; B60C 13/04
[52] U.S. Cl. .................. 156/116; 156/394.1; 156/406.2; 264/326; 264/315; 264/247; 425/28.1; 425/126.1
[58] Field of Search ..................... 264/326, 315, 264/247; 156/116, 406.2, 394.1; 425/28.1, 126.1

[56] References Cited

U.S. PATENT DOCUMENTS

| | | | |
|---|---|---|---|
| 3,648,748 | 3/1972 | Lovell | 152/353 |
| 3,769,123 | 10/1973 | Botts et al. | 156/116 |
| 4,003,420 | 1/1977 | Sandstrom et al. | 156/116 |
| 4,684,431 | 8/1987 | Shurman et al. | 156/116 |
| 4,767,481 | 8/1988 | Bryant et al. | 156/116 |
| 4,967,818 | 11/1990 | Gartland et al. | 152/524 |
| 5,049,220 | 9/1991 | Gartland et al. | 156/116 |
| 5,058,647 | 10/1991 | Gartland et al. | 152/524 |
| 5,160,383 | 11/1992 | Gartland et al. | 152/510 |

*Primary Examiner*—Michael W. Ball
*Assistant Examiner*—Samchuan Yao
*Attorney, Agent, or Firm*—T. P. Lewandowski; Fred K. Lacher

[57] ABSTRACT

A pneumatic tire includes a strip of white rubber which is added to the otherwise black tire sidewall. The strip is molded separately from the other tire components and is added to the unvulcanized tire at the tire curing press. The strip is pressed into a recess in the sidewall forming surface of the upper tire mold half by a carrier ring which swings into the tire press with the green tire loader. The strip of white rubber is then affixed to the tire during molding of the tire.

15 Claims, 6 Drawing Sheets

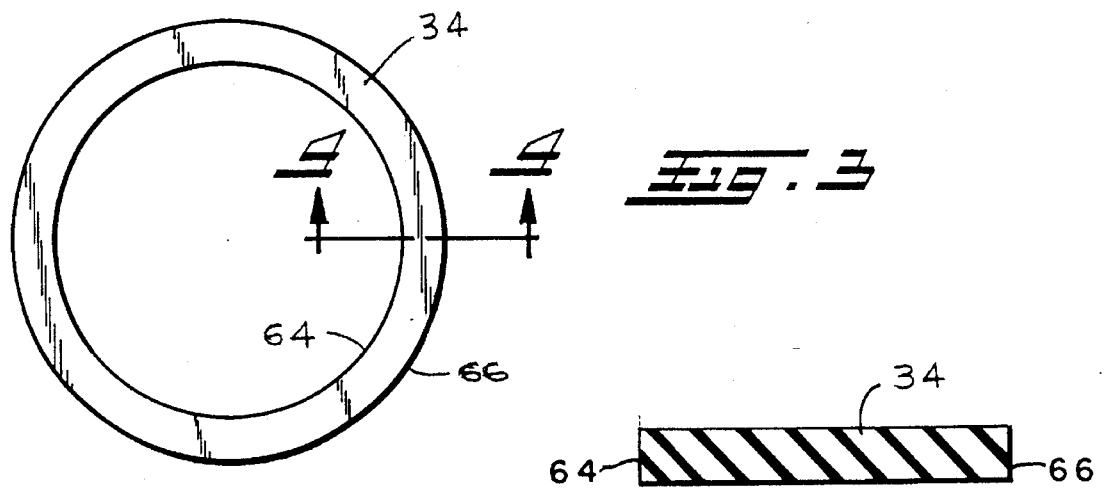
Fig. 3
Fig. 4
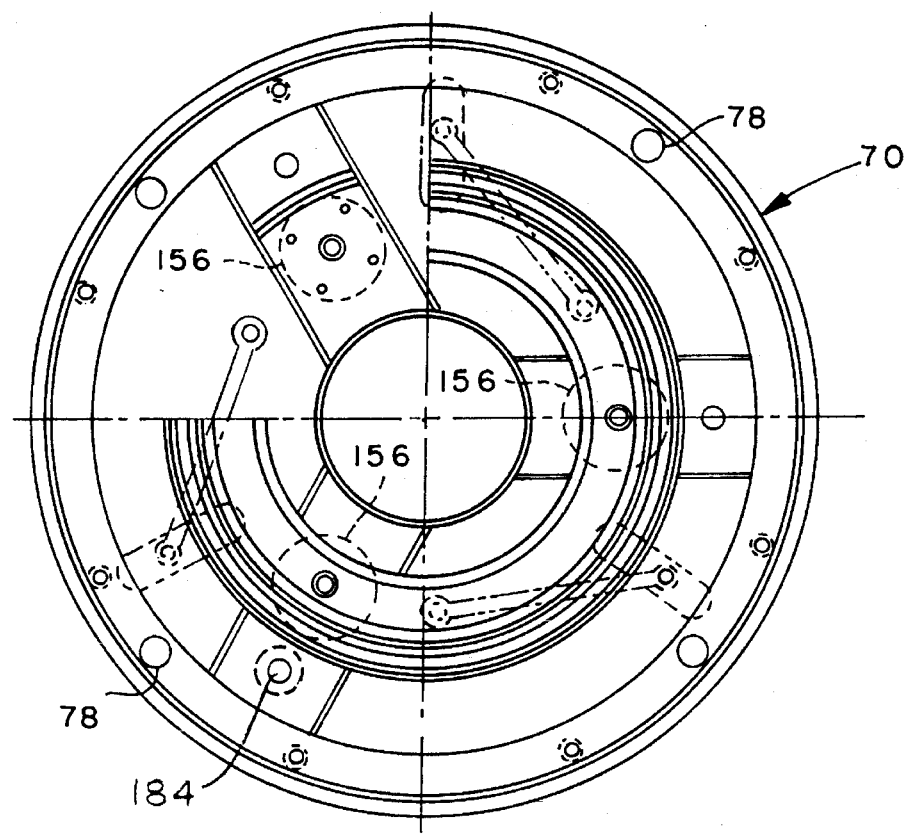
Fig. 5

APPARATUS FOR PRODUCING TIRE WITH INJECTION MOLDED WHITE SIDEWALL

This invention relates to a pneumatic tiré having a sidewall which includes a strip or insert of a different color than the rest of the tire sidewall and which is affixed to the outer surface of the sidewall through an innovative method and apparatus. In the manufacture of radial tires known as "white sidewall tires", it has been necessary to manufacture the rubber used in the white-colored white sidewall separately from the rubber used in the rest of the tire. Because the tire components other than the white sidewall utilize rubber containing carbon black, these components are black in color. In order to obtain the desired white appearance of the white sidewall, white-colored rubber had to be manufactured and processed in equipment different from the equipment used to process rubber containing carbon black. Therefore, even though the white sidewall portion of the tire comprised a very small portion of the tire, essentially duplicative rubber processing equipment was required in order to produce the narrow strip of white-colored rubber.

It has been found that the same white sidewall appearance can be obtained through a different and innovative manufacturing method and apparatus resulting in a different and innovative white-colored strip which provides equivalent or superior performance at a lower cost.

SUMMARY OF THE INVENTION

In accordance with one aspect of the invention, there is provided a tire sidewall having an inside and an outside annular groove which defines an annular strip therebetween. The annular groove is of different material than the rest of the sidewall. One side surface of each groove exposes the strip material and the other side surface exposes the sidewall material.

In accordance with another aspect of the invention, there is provided a pneumatic tire having a carcass with a pair of bead portions. A tread is disposed radially outwardly of the carcass and has a ground-contacting surface.

A pair of sidewalls extend radially inwardly from the tread along outer surfaces of the carcass toward the bead portions. The sidewalls have outer surfaces extending from the tread radially ground-contacting surface to the bead portions. A strip is affixed to the outer surface of one of the sidewalls. The strip is made from a different elastomeric compound than an elastomeric compound of the sidewall. The strip is of a different color than the elastomeric compound of the sidewall. For example, in the preferred embodiment, the elastomeric compound of the strip is white while the elastomeric compound of the tire is black. The outer surface of one of the sidewalls includes an annular groove having walls and a base. The strip is affixed to the base of the groove in the outer surface of the sidewall. The strip has side surfaces, a top surface and a bottom surface. The top surface of the strip is wider than the bottom surface. The side surfaces of the strip have indentations near the bottom surface. The strip may be molded, such as by injection molding. The side surfaces of the strip make an angle of between 45° and 75° with the top surface of the strip. In one embodiment, the sidewall includes a stain barrier which is positioned inwardly of the strip.

In accordance with another aspect of the invention, there is provided a method for building a pneumatic tire including the steps of:

(a) assembling unvulcanized components of the pneumatic tire including a sidewall;

(b) building the unvulcanized components of the pneumatic tire into a vulcanized tire;

(c) preforming an annular strip;

(d) affixing the strip to said unvulcanized sidewall as of the last step of assembly of said unvulcanized tire by pressing the unvulcanized sidewall and strip of the unvulcanized pneumatic tire against a sidewall surface of the tire mold;

(e) vulcanizing the strip and the unvulcanized pneumatic tire.

In one embodiment of the invention, the affixing of the strip includes the steps of:

(a) loading the strip into a mounting means for mounting the strip into a recess in a sidewall forming surface of the tire mold;

(b) moving the mounting means and strip to the sidewall forming surface; and, (c) pressing said strip into the recess.

In accordance with another aspect of the invention, there is provided a method of loading an elastomeric strip into a tire mold comprising the steps of:

(a) loading the strip into a mounting means for mounting the strip in a recess in a sidewall forming surface of the tire mold;

(b) moving the mounting means and strip to the sidewall forming surface;

(c) registering the mounting means against the mold; and, (d) pressing the strip into the recess.

In accordance with another aspect of the invention, an apparatus is provided for applying a strip to an outer surface of a sidewall of a pneumatic tire, the apparatus having a tire mold which in turn has a sidewall forming surface to form a sidewall of the pneumatic tire. The sidewall forming surface has a recess adapted to receive the strip. The apparatus further has mounting means for mounting the strip in the recess and loading means for loading an unvulcanized pneumatic tire in the tire mold. The apparatus also includes pressurizing means for pressurizing an interior of the tire. The sidewall forming surface includes spaced-apart rings extending outwardly from the surface of the sidewall forming surface. Each one of the spaced-apart rings has an edge and each edge has retention means for retaining the strip. The retention means includes an angled interior side of the ring. The apparatus further includes lifting means for lifting the mounting means into engagement with the sidewall surface of the tire mold. The apparatus also includes a tire vulcanizing press which has a press beam having an opening. The lifting means is affixed to the press beam through the opening in the press beam. The lifting means includes a center rod and an adjustable stop which is slidably affixed to the center rod. The adjustable stop is slidably adjustable along the center rod to accommodate molds of different thicknesses. The mounting means is not mechanically attached to the lifting means but is selectively lockable thereto. The mounting means includes a bead stop, the bead stop registering the mounting means against a top bead ring in the mold. The mounting means also includes pushing means for pushing the strip into the recess. The pushing means pushes the strip into the recess after the bead stop has registered the mounting means against the top bead ring. The mounting means includes centering means centering the pushing against the sidewall forming surface of the tire mold. The centering means includes a cylindrical ring having an angled upper surface which cooperates with an angled lower surface of the mounting restore mounting means to center the pushing means.

DESCRIPTION OF THE DRAWINGS

FIG. 3 is a plan view of one embodiment of a strip according to the invention.

FIG. 4 is a cross-sectional view of a strip according to the invention taken along line 4—4 of FIG. 3.

FIG. 5 is a plan view of a carrier ring according to the present invention with parts being broken away to show one of the support arms.

DESCRIPTION OF THE EMBODIMENT

Figure 1:
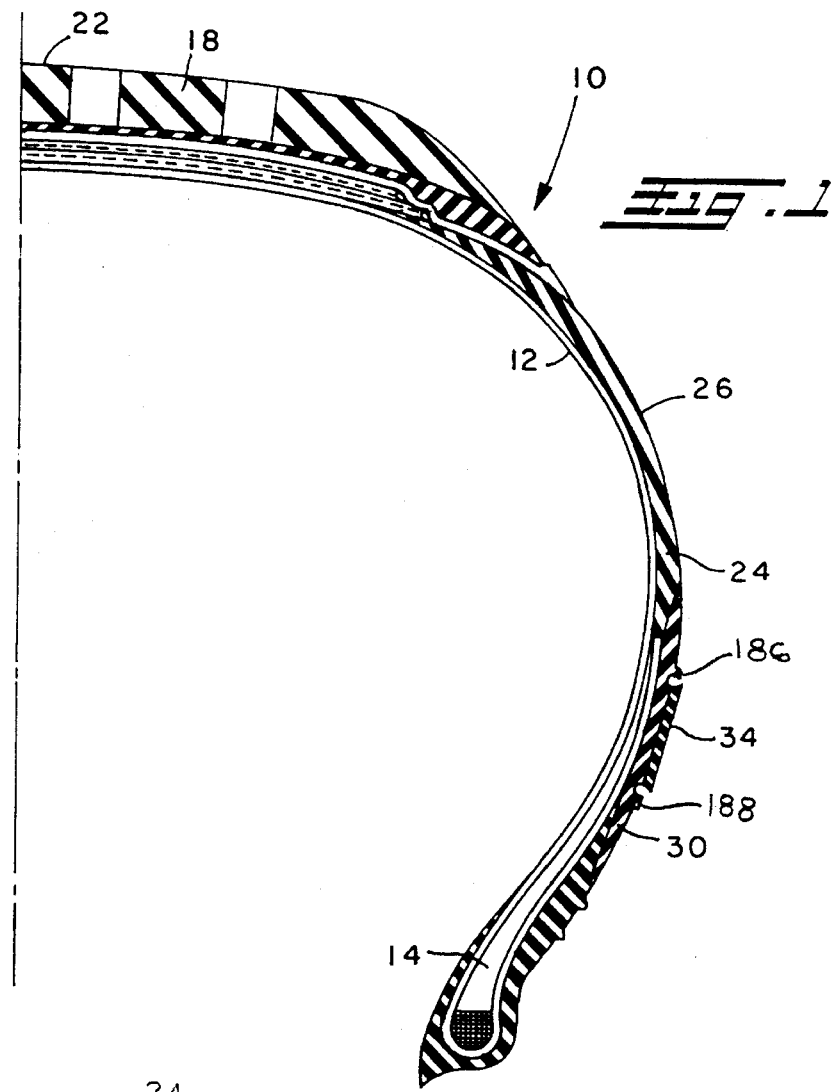
FIG. 1 is a cross-sectional view of one-half of a tire incorporating a strip according to the invention.

With reference to FIG. 1, a cross-sectional view of one-half of a tire 10 according to the invention is shown. The overall construction of the tire 10 is not a part of the invention although it will be described here in order to provide an explanation of the general environment in which the invention operates. The tire 10 includes a carcass 12 having a pair of bead portions 14 respectively. A tread 18 is disposed radially outwardly of the carcass 12. The tread has a ground-contacting surface 22. A pair of sidewalls 24 extend radially inwardly from the tread 18 along outer surfaces of the carcass 12 toward the bead portions 14. The sidewalls 24 have outer surfaces 26 which extend from the tread radially ground-contacting surface 22 to the bead portions 14. In a preferred embodiment, a stain barrier 30 may be incorporated into a sidewall 24 of the tire 10. The stain barrier 30 prevents the black color of the tire sidewall 24 from bleeding through to a white sidewall strip 34.

In a conventional tire, the white sidewall is made of conventional elastomers which do not contain carbon black, the black-colored substance which gives tires their black color. Carbon black is a very pervasive substance, coloring nearly everything it touches. In order to make a white sidewall elastomer with the desired pristine whiteness, separate Banbury mixers, separate mills, and generally separate manufacturing and handling equipment is required to manufacture and process the white elastomer. As such, even though the white sidewall is a very small part of the tire and adds no performance characteristics or structural strength to the tire, it adds a very significant element to the cost of the tire, due to the difficulty in processing and manufacturing it.

Nonetheless, the appeal of white sidewall tires to consumers is such that white sidewalls have remained an important element in many pneumatic passenger tires. The present invention provides a tire 10 with equivalent or superior appearance without requiring the large-scale Banbury mixers, mills, and other manufacturing and handling equipment necessary to manufacture a white sidewall tire by conventional methods.

With continuing reference to FIG. 1, a strip 34 is affixed to the outer surface 26 of one of the sidewalls 24. The strip 34 is comprised of a elastomer which, in a preferred embodiment, may be injection molded in a ring shape and is added to the rest of the tire components in the tire mold just prior to vulcanization, rather than being built into the tire 10 at the tire building machine along with the rest of the components. The method and apparatus for manufacturing, loading, and assembling the tire 10 as described will be discussed later in this specification.

Figure 2:
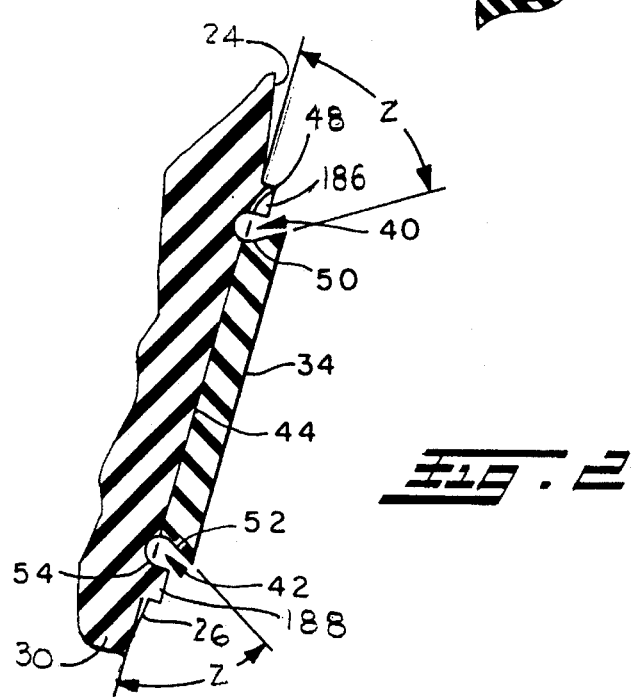
FIG. 2 is an enlarged fragmentary cross-sectional view of a tire sidewall incorporating a strip according to the present invention.

With reference to FIGS. 1–4, the configuration of the strip 34 will be described. In FIG. 2, the portion of the tire sidewall 24 which receives the strip 34 is shown in an enlarged view. First and second grooves 40,42 define a plateau 44 on the outer surface 26 of the sidewall 24. Each of the grooves 40,42 has a base. The first groove 40 has a radially outer wall 48 and radially inner wall 50 while the second groove 42 has radially outer wall 52 and radially inner wall 54. The radially outer walls 48,52 of each of the grooves 40,42 expose different materials than do the radially inner walls 50,54. For example, the radially outer wall 48 of the first groove 40 exposes sidewall 24 while the radially inner wall exposes strip 34. It is also important to have a narrow groove so that the interface between the strip and tire body is not exposed.

In the preferred embodiment, the grooves 40 and 42 are about 0.03 inches (0.0762 cm) wide and the radially inner wall 50 of the first groove 40 and the radially outer wall 52 of the second groove 42 each make an angle of between 45° and 75° with a plane containing the plateau 44 or with a plane containing the top surface 60 of the strip 34. In the preferred embodiment, the angle is 60°.

With reference to FIG. 3, the strip 34 is shown as an annulus or ring. This is the preferred configuration of the strip 34 although, depending on the visual effect desired, this strip could be made up of several segments, or of a single ring of varying widths or configurations.

With reference to FIG. 4, the strip 34 of FIG. 3 is shown in cross-section. The strip includes a top surface 60, a bottom surface 62, and side surfaces 64,66. When in place on the tire sidewall 24, the top surface 60 is axially outward of the bottom surface 62 and one of the side surfaces 64,66 is radially outward of the other.

The strip 34 is preferably made of an elastomeric compound according to U.S. Pat. Nos. 4,967,818 and 5,049,220 to Gartland et al., which are incorporated herein by reference in their entireties.

PREFERRED METHOD AND APPARATUS

With reference to FIGS. 5–13, the apparatus and method used to build a tire incorporating the strip 34 will be described.

With particular reference to FIGS. 5–9, the one embodiment of a mounting means for mounting the strip 34 on a tire mold 82 is illustrated. In this embodiment, the mounting means includes a carrier ring 70. After the strip 34 is molded, it is loaded into the carrier ring 70 to be affixed to a sidewall forming surface 126 of the tire mold 82.

Figure 6:
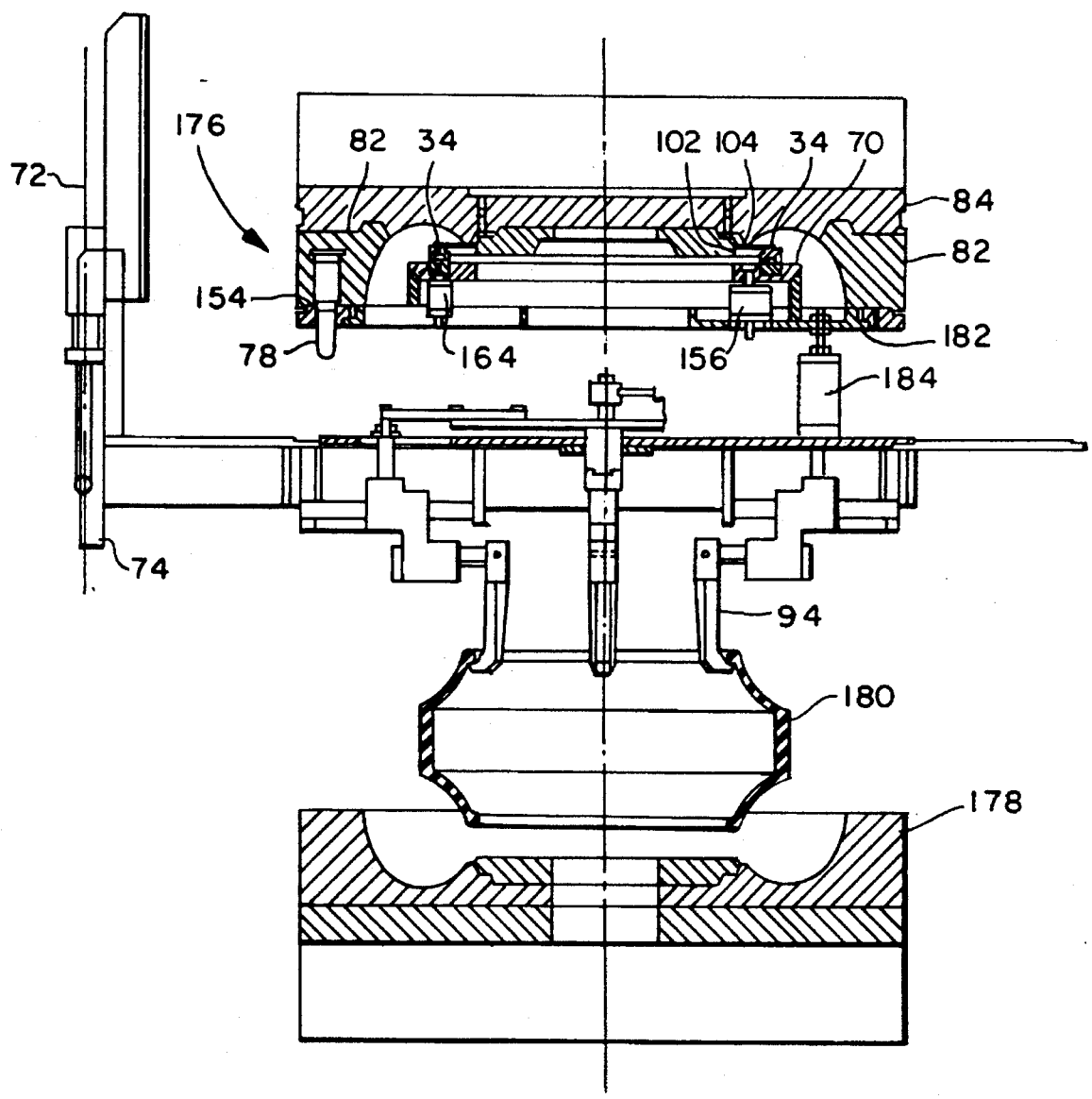
FIG. 6 is a front cross-sectional view of a carrier ring assembly and tire loader shown in FIG. 5 showing a green tire on the loader and the upper and lower molds.

In this embodiment, the carrier ring 70 is mounted on an intermediate plate assembly 182 carried on loader 94 and selectively swingable about axis 72 to carry it about rod 74 which has a centerline coincident with axis 72. As shown in FIG. 6, the carrier ring 70 is supported on a green tire loader 94 and swings into the tire press 84 between the open mold halves 176 and 178 when the green tire 180 is being loaded.

With continuing reference to FIGS. 5–9, one of the important aspects of the invention is the method and apparatus utilized to accurately position the strip 34 in proper location in the top half 176 of the tire mold 82. In the preferred embodiment, first and second registering means are utilized for rough and fine registering of the strip 34 against the sidewall forming surface 126 of the tire mold 82.

The first registering means which includes the lifting of the tire loader 94 registers the intermediate plate assembly 182 against pins 78 in the upper mold half 176. The plate assembly 182 has alignment holes 154 which receive the pins 78 to roughly register the carrier ring 70 relative to the top mold half 176 of the mold 82.

A second registering means provides a more precise adjustment, accurately placing the carrier ring 70 in the proper location upon lifting of the ring by pistons in cylinders 156 mounted on the plate assembly 182. The second registering means includes a bead stop 102 on the carrier ring 70 which registers against a top bead ring 104 in the top mold half 176 of the tire mold 82. The second registering means provides a fine adjustment to very accurately place the strip 34 in the mold 82.

Figure 7:
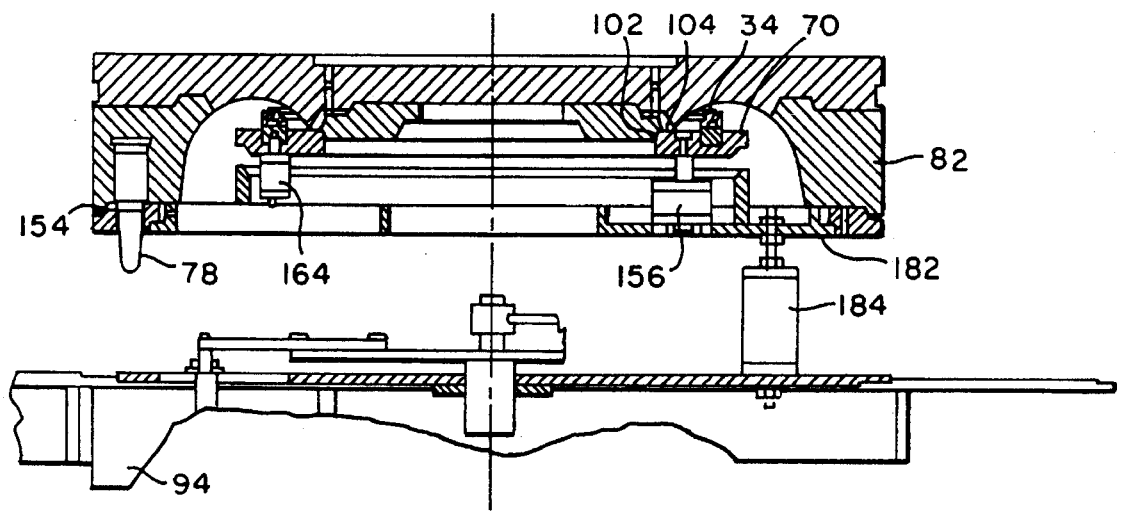
FIGS. 7 and 8 are a partial front sectional views of the carrier ring of FIG. 6, illustrating different positions of the carrier ring in the process of inserting the strip into the recess of the tire mold.
Figure 8:
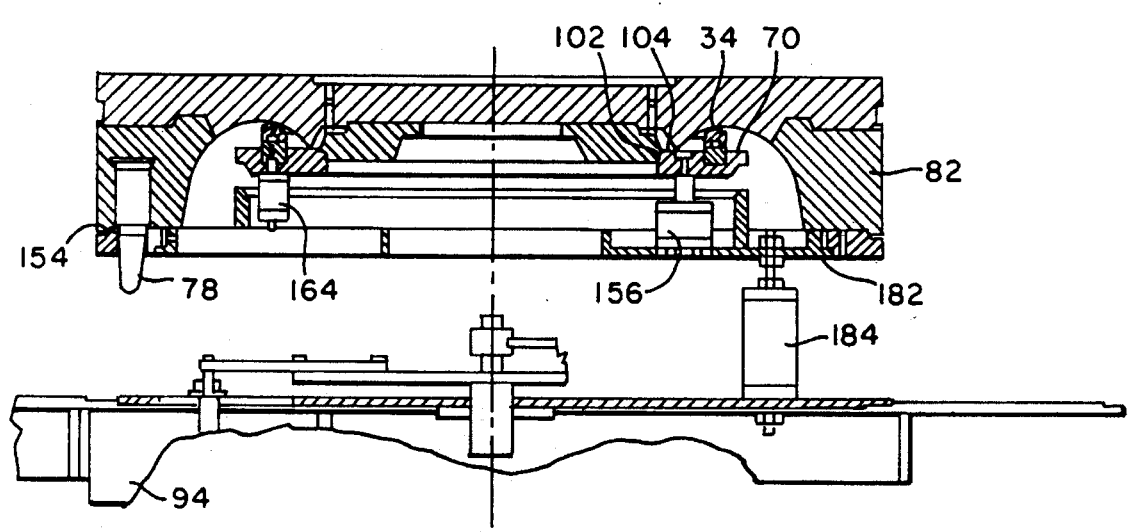

The sequence of operation for this method of registering the strip 34 is illustrated in FIGS. 6–8. With reference first to FIG. 6, the carrier ring 70 is shown in its location at the top of tire loader 94 mounted on the intermediate plate assembly 182 affixed to the top of the tire loader 94 by three spacer posts 184. The loader 94 lifts the plate assembly 182 until pins 78 attached to the tire mold 82 register within holes 154 of the plate assembly 182. This registering provides the coarse adjustment registering discussed above.

With reference to FIG. 7, the next step in applying the strip 34 to the tire mold 82 begins when a first set of cylinders 156 moves the carrier ring 70 toward the upper half of the tire mold until a bead stop 102 registers against the top bead ring 104, as illustrated in FIG. 8.

Figure 9:
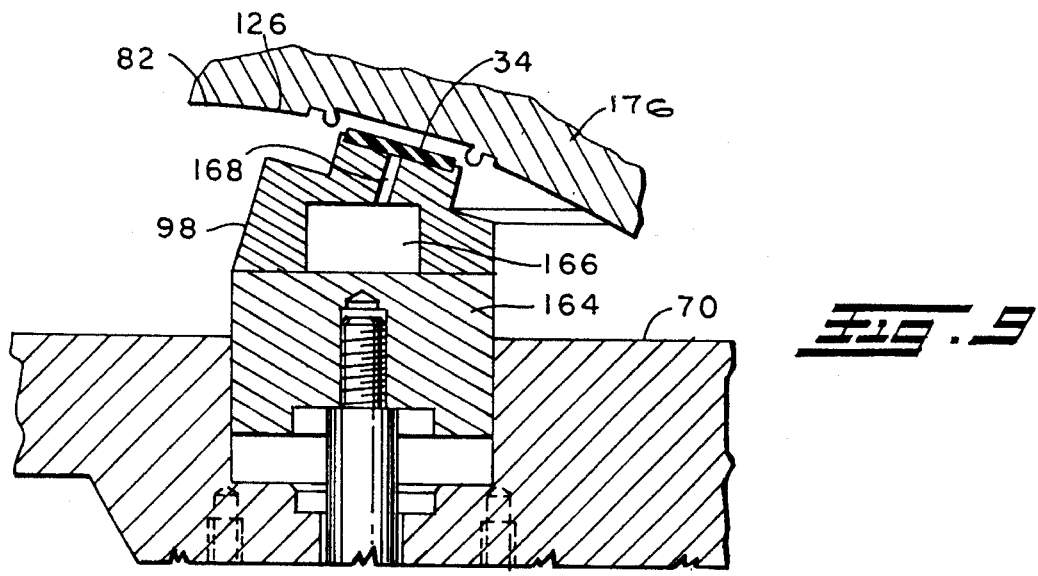
FIG. 9 is an enlarged fragmentary cross-sectional view of the carrier ring, the lifting means and the sidewall forming surface of tire press.

With reference to FIG. 9, after the second registering procedure, or fine registering procedure, is complete and the bead stop 102 is in proper location against the top bead ring 104, a second set of cylinders 160 push the strip 34 against the sidewall forming surface 126 of the tire mold 82. In the preferred embodiment, the travel of the carrier ring 70 due to the action of the second set of cylinders 160 is approximately 0.807 inches.

With reference to FIGS. 7 and 8, the strip 34 has been accurately placed just beneath the portion of the sidewall forming surface 126 to which the strip 34 should be affixed. As illustrated in FIG. 8, after the first registering process illustrated in FIG. 7 and the second registering process illustrated in FIG. 8 is complete, a third set of cylinders 164 are activated, pushing a pusher ring 98 upwardly a distance of approximately 0.185 inches (0.480 cm.) until the strip 34 comes into contact and adheres to the sidewall forming surface 126 of the tire mold 82. With reference to FIG. 9, the apparatus and method is shown in a greatly enlarged view. The pusher ring 98 has a conduit 168 for communicating a vacuum from a vacuum channel 166 to the strip 34. The vacuum operates on strip 34 through the conduit 168 to hold the strip 34 on pusher ring 98. The sidewall forming surface 126 of the mold 82 is heated while in the tire press 84, and after the pusher ring 98 has pushed the strip 34 against the sidewall forming surface 126, the strip 34 tends to stick to the sidewall forming surface to a degree that the pusher ring 98 can be withdrawn from the strip 34 by the second set of cylinders 164 without discontinuing the vacuum application through conduit 168 to the channel 166.

Figure 10:
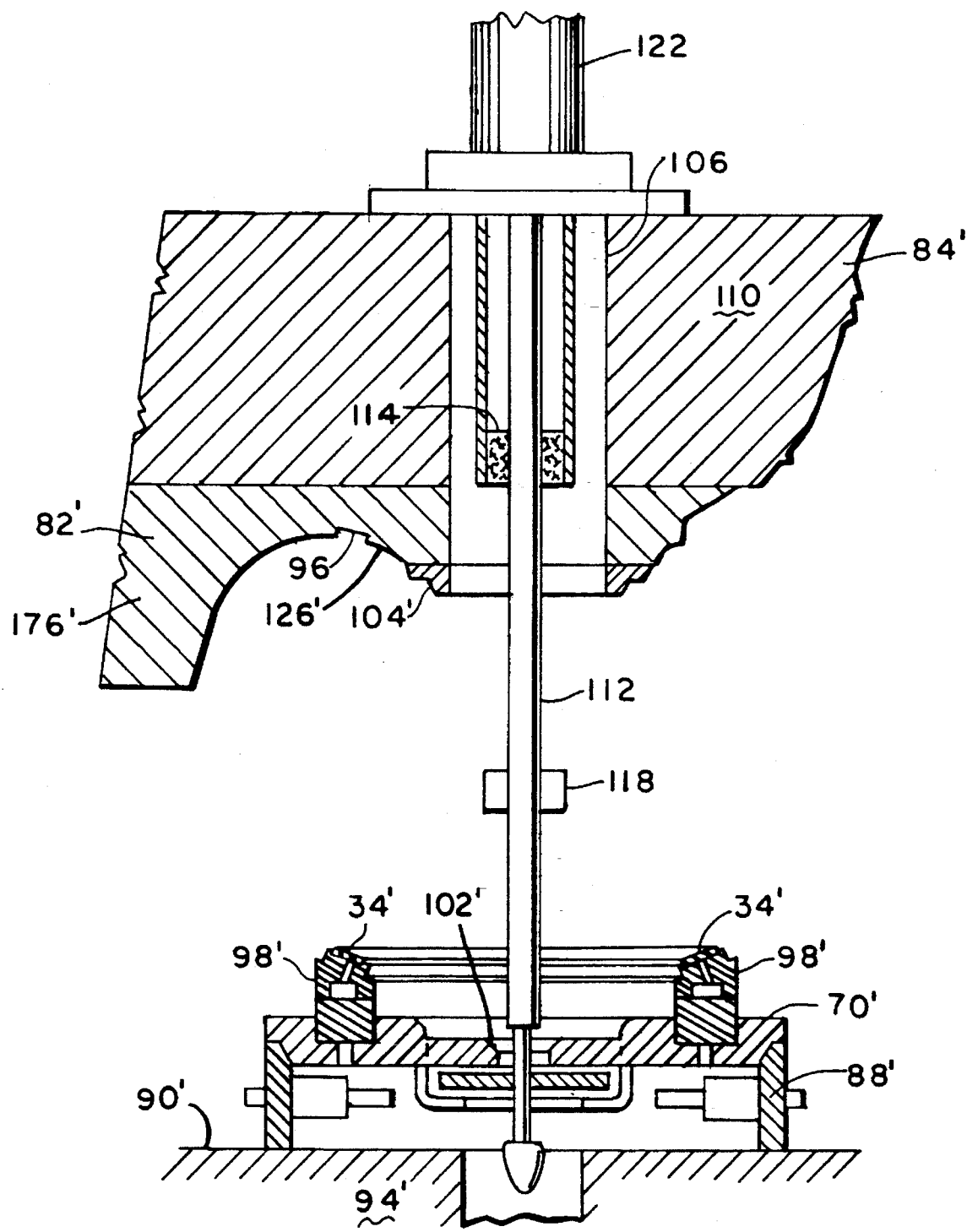
FIG. 10 is a diagrammatic cross-sectional view of a modified form of carrier ring.

With reference to FIG. 10, a second embodiment and method of registering the strip 34 includes a carrier ring 70', the upper mold half 82' a portion 84' of the press 174. The carrier ring 70' is supported on centering rings 88' mounted on the top surface 90' of the tire loader 94'. The strip 34' is carried by pusher ring 98' which in turn is mounted on carrier ring 70'. Instead of lifting the carrier ring 70' to the upper mold half 82' by cylinders 156, as shown in FIGS. 6, 7 and 8, the carrier ring 70' is lifted to the tire press 84' by a center rod 112. The center rod 112 is attached to the tire press 84' by a cylinder 122 mounted on the top press beam 110 and extending through an opening 106 in the top press beam. The carrier ring 70' is releasably held on center rod 112 which extends through opening 106 and a guide bushing 114. Mounted on center rod 112 is adjustable stop 118. The adjustable stop 118 is slidably adjustable along the center rod 112 to accommodate tire molds 82 of different thicknesses.

In this embodiment, the carrier ring 70' is lifted up to the tire mold 82' by the high temperature pneumatic or hydraulic cylinder or a rack and gear lifting device (collectively referred to as 122) which lifts the carrier ring 70' by center rod 112. The carrier ring 70' is lifted upward toward the upper mold half 176' until the strip 34' is near the sidewall forming surface 126' of the mold 82'. At this point, the strip 34' is pushed into recess 96 in the tire mold 82' by suitable pushing means. In the preferred embodiment, the pushing means includes a pusher ring 98' which pushes the strip 34' into the recess 96. Prior to the pusher ring 98' pressing the strip 34' into place, the pushing means is registered in a defined position by bead stop 102' registering against a top bead ring 104' in the mold 82'.

Figure 11:
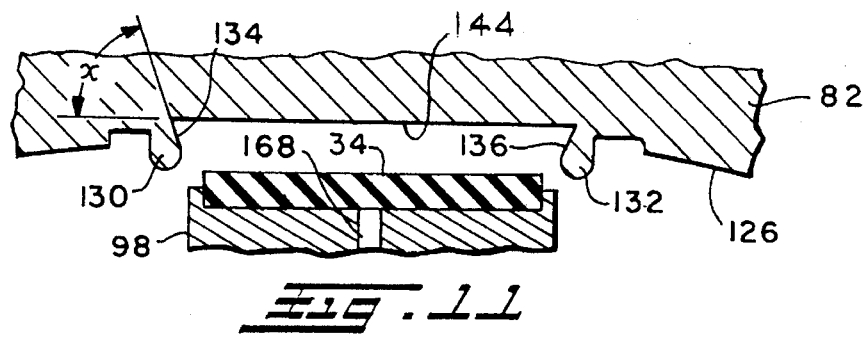
FIG. 11, 12 and 13 are enlarged fragmentary cross-sectional views of the sidewall forming surface of the tire mold the strip and the carrier ring showing different steps in the process of shaping and vulcanizing the strip.
Figure 12:
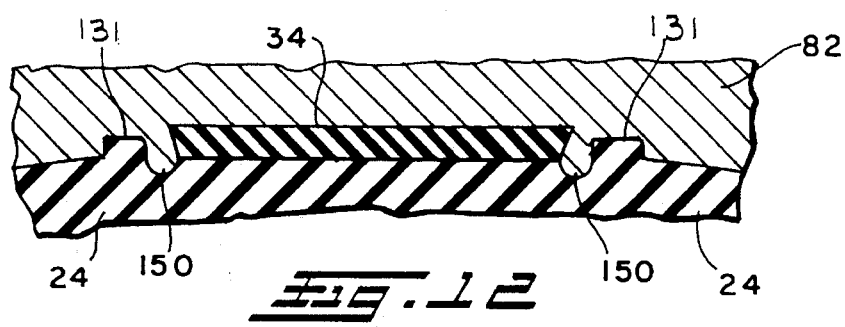
Figure 13:
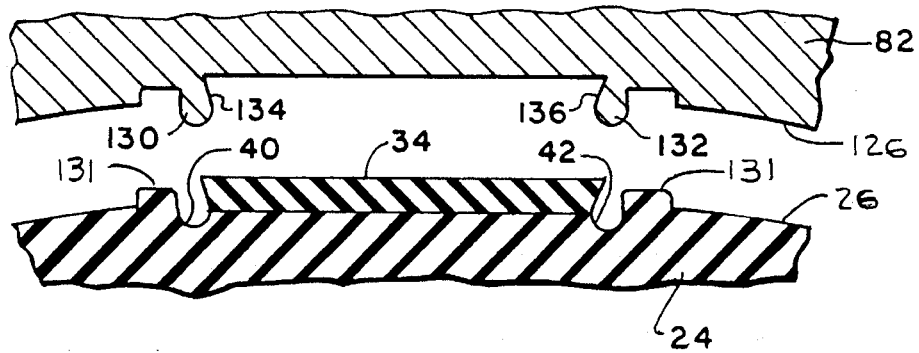

With reference to FIGS. 10–13, enlarged views of a portion of the sidewall forming surface 126 of the tire mold 82 are shown. A pair of spaced apart rings 130,132 extend radially inward from the sidewall forming surface 126. When the pusher ring 98 presses the strip 34 into operative association with the sidewall forming surface 126, the strip is affixed to the sidewall forming surface between the spaced apart rings 130,132. With reference to FIG. 12, during the tire vulcanization process, the strip 34 flows and conforms itself to the space between the spaced apart rings 130,132 eventually adopting the configuration shown in FIGS. 12 and 13. With reference to FIG. 13, the strip 34 is shown after it has been completely adhered to the outer surface 26 of sidewall 24.

With reference to FIG. 11, the interior sides 134,136 of rings 130,132 respectively are sloped so that an angle x between interior sides 134,136 and surface 144 of the sidewall forming surface 126 creates the configuration of the strip 34 shown in FIGS. 12 and 13 wherein the interior sides extend outwardly and form overhanging surfaces at the edge of the strip. In the preferred embodiment, the angle x is between 45° and 75° with the most preferred angle being 60°.

With continuing reference to FIGS. 11–13, the rings 130,132 have a rounded, bulbous configuration at the edges 150 which creates the rounded groove 40,42 shown in FIG.

2. This provides for obscuring the interface between the strip 34 and plateau 44 as described heretofore. At the edges of the first groove 40 and second groove 42 ribs 186 and 188 may be formed projecting outward from the outer surface 26 of the sidewall. The ribs 186 and 188 or another projection from the outer surface 26 may provide scuff resistance to protect the white sidewall strip 34. The ribs 186 and 188 also further obstruct viewing of the side surfaces 64,66 of the strip 34. Also the top surface 60 is wider than the bottom surface 62. Because the top surface 60 is radially outward it is the portion of the strip 34 most easily seen by an observer. Because the top surface 34 is wider than the rest of the strip 34, the side surfaces 64,66 are difficult to see, since the observer of the tire 10 generally is looking in the direction generally perpendicular to the top surface 60. In this way, the side surfaces 64,66, as well as the interface between the strip 34 and the plateau 44 are obscured by the wide top surface 60.

While certain representative embodiments and details have been shown for the purpose of illustrating the invention, it will be apparent to those skilled in the art that various changes and modifications may be made therein without departing from the spirit or scope of the invention.

What is claimed is:

1. An apparatus for applying a strip to an outer surface of a sidewall of a pneumatic tire, said apparatus comprising:
   (a) a tire mold, said mold having a sidewall forming surface to form a sidewall of said pneumatic tire, said sidewall forming surface having a recess adapted to receive said strip;
   (b) mounting means for mounting said strip in said recess;
   (c) loading means for loading an unvulcanized pneumatic tire into said tire mold;
   (d) mold closing means for closing said tire mold; and,
   (e) pressurizing means for pressurizing an interior of said tire to press said sidewall against said strip;
   (f) spaced-apart rings extending outwardly from said sidewall forming surface defining said recess for receiving said strip; and,
   (g) interior sides of said rings being sloped at an angle from 45 to 75 degrees towards said sidewall forming surface to form overhanging surfaces at the edges of said strip.

2. The apparatus of claim 1 wherein one of said rings includes an angled interior side.

3. The apparatus of claim 1 wherein said apparatus further comprises:
   (g) lifting means for lifting said mounting means into engagement with said sidewall surface of said tire mold.

4. The apparatus of claim 3 wherein said mounting means is mechanically separate from said lifting means.

5. The apparatus of claim 1 wherein said mounting means is selectively attached to said loading means.

6. The apparatus of claim 1 wherein said mounting means is attached to said loading means.

7. The apparatus of claim 1 wherein said mounting means further comprises centering means for centering said mounting means on said sidewall forming surface of said tire mold.

8. The apparatus of claim 7 wherein said centering means comprises a cylindrical ring having an angled upper surface for engagement with an angled lower surface of said mounting means to center said mounting means.

9. The apparatus of claim 1 wherein said tire mold has an upper mold half and lower mold half and said mounting means is carried by said loading means from a position outside said tire mold to a position between mold halves of said tire mold, and means for raising said loading means to lift said mounting means into registry with said top mold half.

10. The apparatus of claim 1 wherein said tire mold has an upper mold half supported by a top press beam and a lower mold half with said mounting means being carried by said loading means from a position outside said tire mold to a position between the mold halves of said tire mold and rod means mounted on said top press beam for raising said loading to lift said mounting means off of said loading means into registry with said upper mold half.

11. The apparatus of claim 1 further comprising lifting means for lifting said mounting means into engagement with said sidewall surface of said tire mold.

12. An apparatus for applying a strip to an outer surface of a sidewall of a pneumatic tire, said apparatus comprising:
   (a) a tire mold, said mold having a sidewall forming surface to form a sidewall of said pneumatic tire, said sidewall forming surface having a recess adapted to receive said strip;
   (b) mounting means for mounting said strip in said recess;
   (c) loading means for loading an unvulcanized pneumatic tire into said tire mold;
   (d) mold closing means for closing said tire mold;
   (e) pressurizing means for pressurizing an interior of said tire to press said sidewall against said strip;
   (f) lifting means for lifting said mounting means into engagement with said sidewall surface of said tire mold; and,
   (g) a tire vulcanizing press, said vulcanizing press having a press beam with an opening therethrough, said lifting means being affixed to said press beam through said opening in said press beam.

13. The apparatus of claim 12 wherein said lifting means includes a center rod, said center rod being partially encased in said opening, and an adjustable stop slidably affixed to said center rod, said adjustable stop slidably adjustable along said center rod to accommodate molds of different thicknesses.

14. An apparatus for applying a strip to an outer surface of a sidewall of a pneumatic tire, said apparatus comprising:
   (a) a tire mold, said mold having a sidewall forming surface to form a sidewall of said pneumatic tire, said sidewall forming surface having a recess adapted to receive said strip;
   (b) mounting means for mounting said strip in said recess, said mounting means comprising centering means for centering said pushing means on said sidewall forming surface of said tire mold, said centering means comprising a cylindrical ring having an angled upper surface for engagement with an angled lower surface of said sidewall forming surface to center said mounting means;
   (c) loading means for loading an unvulcanized pneumatic tire into said tire mold;
   (d) mold closing means for closing said tire mold; and,
   (e) pressing means for pressing said strip into said recess.

15. The apparatus of claim 14 wherein said pressing means pushes said strip into said recess after said bead stop has registered said mounting means against said top ring.

* * * * *